United States Patent

Okamoto

[15] 3,637,152

[45] Jan. 25, 1972

[54] ENDLESS TAPE CARTRIDGE CONTAINING A BRAKE TO PREVENT ROTATION OF THE REEL

[72] Inventor: Shinobu Okamoto, No. 4, 180, Oaza-Koga, Koga-shi, Ibaragi-ken, Japan

[22] Filed: Nov. 4, 1968

[21] Appl. No.: 773,257

[30] Foreign Application Priority Data

Nov. 18, 1967 Japan....................................42/97196

[52] U.S. Cl.......................................242/55.19 A, 220/60 R

[51] Int. Cl.........................................................B65h 17/48

[58] Field of Search.....................242/55.19 A, 55.19, 55.21, 242/197, 198, 199, 250; 220/60, 57; 292/87, 25 H

[56] References Cited

UNITED STATES PATENTS

| | | | |
|---|---|---|---|
| 2,499,895 | 3/1950 | Walker | 242/55.19 A UX |
| 2,912,179 | 11/1959 | Schuyler | 242/200 |
| 3,126,163 | 3/1964 | Knox | 242/55.19 A |
| 3,161,362 | 12/1964 | Smith | 242/55.19 A |
| 3,210,482 | 10/1965 | Fischer | 242/55.19 A UX |
| 3,269,671 | 8/1966 | Cole, Jr. | 242/55.19 A |
| 3,350,025 | 10/1967 | Lear | 242/55.19 A |
| 3,420,463 | 1/1969 | Cousino | 242/55.19 A |

*Primary Examiner*—Billy S. Taylor
*Attorney*—Jay M. Cantor

[57] ABSTRACT

An endless magnetic tape cartridge has a rotatable reel supporting the tape coil and provided with a releasable brake to prevent slackness in the tape during handling and storage. The brake includes serrations inclined to the radii of the reel and a spring-biased locking lever pivoted intermediate a hooked locking end and a slotted end coupled to a T-shaped actuating slide. The actuating slide has an arm slidably mounted and a crossarm adjacent a front opening of the cartridge so that insertion of the cartridge into a player results in the player head engaging the crossarm of the actuating slide to shift it rearwardly to thereby pivot the hooked locking end of the brake from the serrated periphery of the reel to permit rotation of the endless tape.

3 Claims, 10 Drawing Figures

INVENTOR

Shinobu Okamoto

BY Harold L. Halpert
Agent

INVENTOR

Shinobu Okamoto

BY Harold L. Halpert
Agent

ENDLESS TAPE CARTRIDGE CONTAINING A BRAKE TO PREVENT ROTATION OF THE REEL

This invention pertains to a magnetic tape cartridge particularly for use with an endless tape.

The tape cartridge embodying this invention has a device which locks the rotating turntable upon which the magnetic tape is wound thereby preventing loosening or tightening of the tape during transportation or handling, the cartridge features a top and bottom casing which is held together by a locking finger which can be released from outside of the cartridge by inserting a special opening tool. The cartridge also features a pressure pad which holds the magnetic tape against the tape head and is comprised of a layer of felt applied to the surface of a sponge block.

It is well known that a certain amount of slack in the tape wound around a suitable hub is necessary for the operation of an endless tape cartridge. Due to this slack, when a suitable locking device is not employed, the tape tends to unwind or tends to become caught between the top of the hub and the cartridge cover, or tends to become tightly wound against the hub and thus prohibits the removal of tape from inside of the hub, and as a result the tape is broken or damage to the cartridge can be caused.

Furthermore, when the cartridge receives vibrations or due to other stresses, the screw holding the cover to the base part of the cartridge is liable to become loosened and cause the cover to lift, or if the screw becomes completely unscrewed, the cover can come off completely thus causing the tape to tangle and become damaged.

Furthermore, when the pressure of the pressure pad is not suitable, the magnetic tape will not contact the tape head causing poor reproduction or may contact the tape head with excessive pressure to cause slowing down of the tape and unsatisfactory reproduction.

The endless tape cartridge embodying this invention features a device which prevents rotation of the reel, to which the tape is wound, by vibrations and shocks experienced during transportation and handling. Moreover, the tape contacts the tape head in a proper manner to provide reproduction of good fidelity and low noise.

The endless tape cartridge embodying this invention comprises a tape wound around the hub of a reel turntable, the turntable has serrations around its periphery which is formed to lock in the direction of rotation of the turntable, a lever which is shaped and positioned to lock with said serrations, a sliding arm which engages said locking lever to lift the lever when pushed inwards by the pressure from the tape head or its housing when the cartridge is locked in playing position, thus permitting the reel to rotate freely only when the cartridge is inserted against the tape head in "play" position.

The endless tape cartridge embodying this invention has three protrusions formed in the inside surface of the top casing. The two pins formed on the rear end engage corresponding posts formed on the inner surface of the bottom casing, the single finger formed in front of the aforementioned two pins is formed with a hook at its extremity to engage a flexible rib member with suitable openings formed on the inner surface of the bottom part of the casing, and with a suitable slot formed in the bottom part, to enable a tool to be inserted from the outside of an assembled cartridge to bend the flexible rib to release the aforementioned finger. Thus, when the top casing of the cartridge is locked to the bottom casing, the locking finger and flexible rib are firmly connected to prevent loosening of the top and bottom casings of the cartridge, even when the cartridge is subjected to severe vibrations or shocks.

The endless tape cartridge embodying this invention features a pressure pad which is comprised of a sheet of felt applied to the surface of a sponge plastic block which exerts optimum pressure to the tape to hold it against the tape head and thereby producing faithful reproduction free from noise. The back surface of the aforementioned sponge block is backed with a backplate which is inserted in suitable slots in the cartridge casing permitting easy replacement when necessary.

Figure 1:
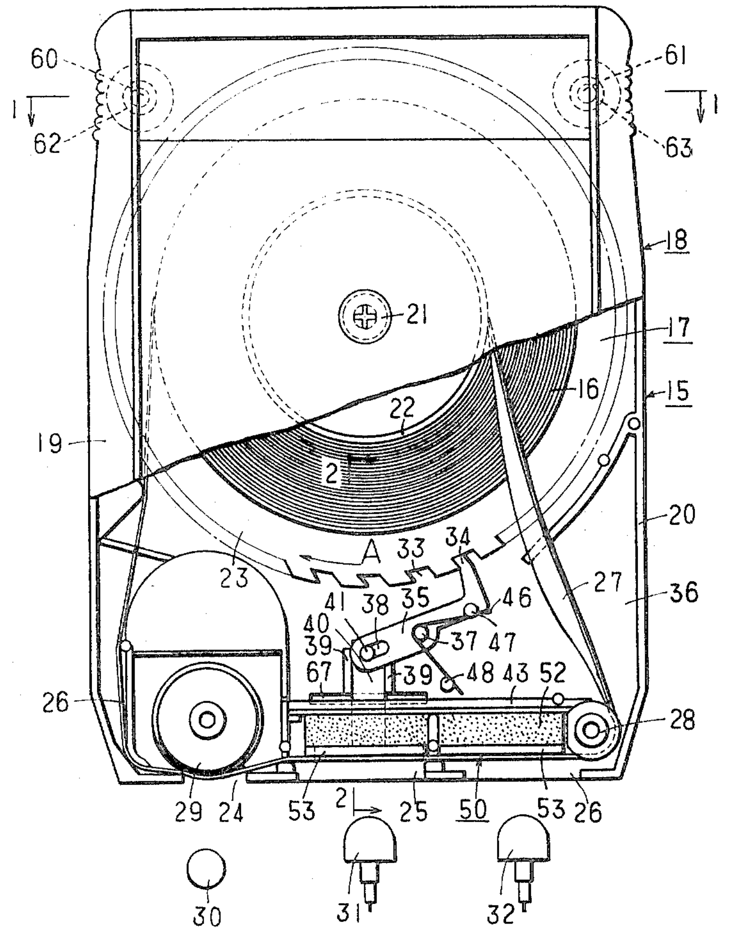
FIG. 1 is a plan view with a part of the top casing removed to show the interior.
Figure 2:
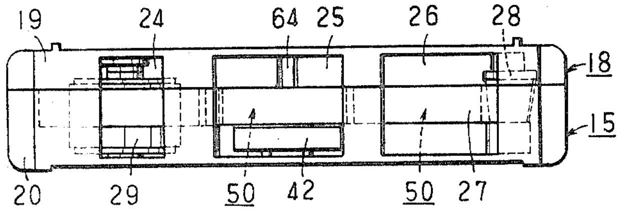
FIG. 2 is a frontal view.
Figure 3:
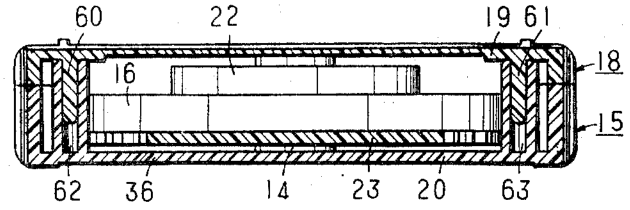
FIG. 3 is a section taken on line 1—1 of FIG. 1.
Figure 4:
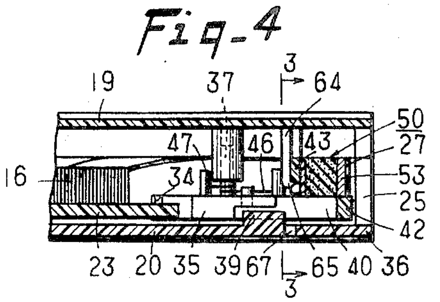
FIG. 4 is a section taken on line 2—2 of FIG. 1.
Figure 5:
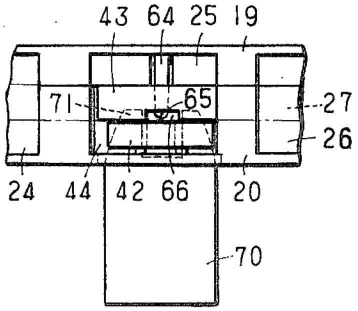
FIG. 5 is a frontal view with the tool for opening the cartridge inserted.
Figure 6:
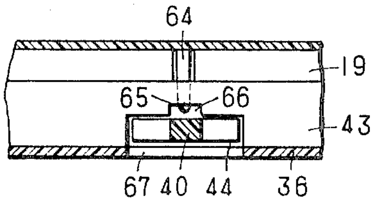
FIG. 6 is a section taken on line 3—3 of FIG. 4.

Cartridge 15 is basically a container formed of two boxlike plastic moldings which can be produced in large quantities at a comparatively low cost, and which contains endless tape 16 wound on reel turntable 17. To operate, the cartridge is manually inserted into the reproducing device, and reproduction can be heard immediately.

Casing 18 of cartridge 15 comprises of top casing 19 and bottom casing 20. Spindle 14 is molded into bottom 20 and serves as the spindle for reel turntable 17. Spindle 14 is tapped for screw 21 which serves to assist in securing top 19 to bottom 20. Turntable reel 17 consists of hub 22 and disc plate 23. An endless tape 16 is wound spirally around hub 22 and is unwound from the inside, in other words the tape adjoining the hub is removed and is rewound on the outside.

The front face of casing 18 has openings 24, 25, and 26. Tape loop 27 passes on the outside of guidepost 28 formed on bottom 20, and pinch roller 29 which is rotatably pinioned on bottom 20, and is positioned directly behind openings 24, 25 and 26.

When cartridge 15 is positioned in the reproducing machine, rotating capstan 30 of the reproducing machine engages tape 27 thru opening 24 by pressing against pinch roller 29. Tape 27 is transported at a constant speed by the rotation of capstan 30. The other openings 25 and 26 provide openings whereby tape heads mounted on the reproducing machine engage the tape and pick up the recorded sound.

Disc 23 of reel turntable 17 has serrations 33 formed on its periphery which tend to lock when the disc rotates in direction A. A lock lever arm 35 has a lock 34, which is formed to engage serration 33 at one end, and has a slotted hole 38 at the other end; said lever arm rotates around pivot 37 formed as part of bottom plate 36 of casing bottom 20.

An arm 40 slides between guide plates 39 formed in bottom plate 36 and is connected to lever arm 35 by pin 41 which engages slotted hole 38. The arm is formed in the shape of an inverted "T" with the top part 42 below pressure pad 50 which is mounted on the front of rib 43 formed as a part of plastic case bottom 20. The stem of arm 40 passes thru opening 44 formed in rib 43. The front surface of top part 42 is positioned slightly behind the front surface of opening 25 of casing 18.

Lock 34 of lever arm 35 is pressed firmly against one serration 33 of disc 23 of turntable reel 17 by anticlockwise rotatory action of spring 46 which is wound around pin 37 and bears against stopper pin 47 mounted on the lever arm and pin 48 formed on bottom plate 36. Reel turntable 17 is therefore clamped so that any vibrations or shocks received during transportation and handling will not cause the reel turntable 17 to rotate. Thus, loosening of tape 16 or tightening of the tape or displacement of the tape to catch between the top hub surface and the casing is effectively prevented.

When cartridge 15 is inserted into the reproducing machine for playing the tape, head section 42 of sliding arm 40 is pushed by head 31 or its casing. Arm 40 pushes lever arm 35 to rotate this arm in a clockwise direction around pivot 37 to cause catch 34 to release serration 33 of disc 23 of reel turntable 17 and thereby permit free rotation of the reel turntable. Thus, tape 27 is pulled by the rotation of capstan 30 from the inside of the tape reel which adjoins hub 22 of reel 17 and is wound onto the outside of the tape reel. In this manner reproduction from the transported tape is obtained.

Two pins 60, 61 are formed on the inside surface of the top 19, these pins are positioned to engage corresponding posts with guide holes formed therein on the inside surface of the bottom 20. Finger pin 64 with hook-shaped end 65 is formed in the inside surface of the top 19. The hook-shaped end 65 is positioned to engage the top portion of opening 44 in rib 43 and is positioned to engage notch 66 formed in the top part of opening 44. Thus, top part 19 is firmly clamped to bottom part 20. Screw 21 serves to further hold the two parts together.

As a result of the above construction, in the event that screw 21 loosens by vibration and shock received by cartridge 15 during transportation or handling—as is common with all ordinary screws, hook portion 65 of lock finger 64 locks with rib plate 43 which is molded as an integral part of bottom casing 20. Therefore, top casing 19 is securely locked with bottom casing 20 and thereby prevents all the malfunctions resulting from loosening of the top and bottom parts of the cartridge.

Figure 7:
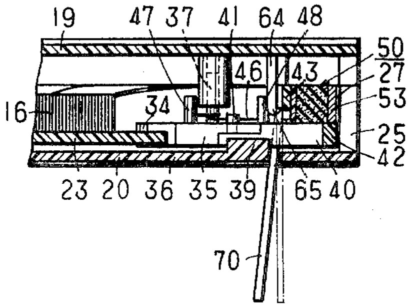
FIG. 7 depicts the tool inserted as shown in FIG. 4 and pushed backward to bend the wall section of the casing to release the top casing from the bottom.
Figure 8:
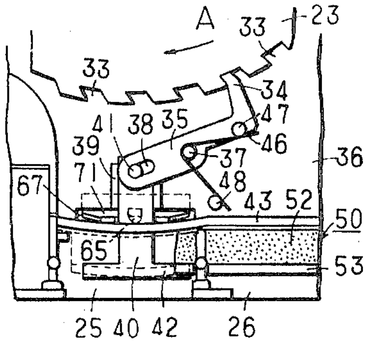
FIG. 8 is a plan view of FIG. 7 with the top casing removed.
Figure 9:
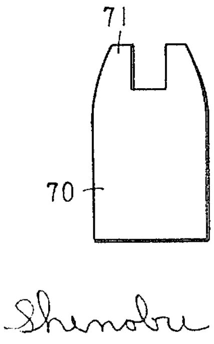
FIG. 9 is a front view of the release tool.
Figure 10:
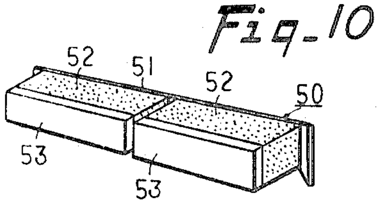
FIG. 10 is a perspective view of the pressure pad.

The top and bottom casings can be separated with extreme ease as follows: screw 21 which secures bottom 20 to top 19 (as an auxiliary measure) is removed, the notched end 71 of opening tool 70 is inserted into slot 67 formed through the bottom plate 36 to form opening 44 in rib 43. The tool is inserted at a slightly forward angle so that its two legs bear against the back surface of rib 43. When tool 70 is pressed backwards, rib 43 is bent forwards FIG. 7 and FIG. 8 so that hook 65 of finger 64 is released from notch 66 formed in opening 44. The front part of top casing 19 is lifted slightly to disengage the finger while pressure is applied to the tool, pressure on the tool can be released as soon as unlocking of the finger is established. Top casing 19 should then be parted from bottom casing 20 by lifting with a translatory motion (parting the top and bottom in parallel motion to each other).

Tape pad 50 consists of backing plate 51 to which sponge 52 is cemented. Felt sheet 53 is cemented to the front surface of sponge 52. Tape pad 50 is inserted between the front surface of rib 43 and tape 27 covering openings 25 and 26. When the cartridge is inserted in a suitable reproducing machine, the tape heads 31 and 32 are positioned to press against the tape 27 and tape pad 50 provides optimum pressure and friction which results in noise-free good fidelity reproduction.

As a result of experiments, when the tape width is 6.35 mm., the thickness of the plastic sponge 52 should be 7.5 mm. to 6.5 mm., thickness of the felt should be 1 mm. to 2 mm. When the thickness of the sponge exceeds 8 mm., the backing force of the sponge increases to cause the tape pressure against heads 31 and 32 to become excessive; resulting in loss of tape speed and faithful reproduction. When the thickness of the sponge is less than 6 mm. the backing force becomes weak so that there is insufficient contact pressure between the tape and the tape heads; this results in spotty reproduction and noise. When the thickness of the felt is increased to over 3 mm. resiliency of the friction surface decreases and causes poor contact between the tape and tape head; resulting in noisy reproduction. When the thickness of the felt is decreased to less than 1 mm. resiliency becomes excessive causing the friction surface to extend and excessive friction between the tape and tape heads results; this causes loss in tape speed and poor reproduction.

I claim:

1. An endless tape cartridge comprising a reel turntable, an endless tape spirally wound on said turntable, serrations formed around the periphery of said turntable and shaped as to prevent rotation by locking in the direction of rotation, a catch lever arm pivotally mounted on the base of the cartridge with a lock catch to engage one serration of the turntable at one end, and a slotted hole at the other end, a spring urging said catch lever to lock against the turntable at all times, means for releasing the catch lever comprising a sliding inverted "T"-shaped member sliding between two guides molded into the base of the cartridge, the head of the member being positioned to bear against the tape head and the stem of the member mechanically connected to said slotted hole to rotate the catch lever arm and release the turntable by sliding inwards when pushed by the tape head when the cartridge is inserted in "play" position.

2. A cartridge as defined in claim 1 wherein said cartridge includes a housing, said housing comprises a pair of cup sections, a flexible rib integral with one of the sections, a hook integral with the other section and interlocked with the rib to retain the cup sections in engagement with each other.

3. A cartridge as defined in claim 2 further including a tool opening in said one of the sections aligned with the rib whereby a tool can be inserted into said opening to engage the rib and pry the rib out of engagement with the hook.

* * * * *